(12) United States Patent
Tokumoto et al.

(10) Patent No.: US 10,919,258 B2
(45) Date of Patent: Feb. 16, 2021

(54) METHOD FOR MANUFACTURING COSMETIC SHEET, COSMETIC SHEET, METHOD FOR MANUFACTURING COSMETIC PANEL, AND COSMETIC PANEL

(71) Applicant: TOPPAN PRINTING CO., LTD., Tokyo (JP)

(72) Inventors: Naoki Tokumoto, Tokyo (JP); Shin Oota, Tokyo (JP); Jun Mizutani, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 533 days.

(21) Appl. No.: 15/818,700

(22) Filed: Nov. 20, 2017

(65) Prior Publication Data
US 2018/0072017 A1    Mar. 15, 2018

Related U.S. Application Data

(63) Continuation of application No. PCT/JP2016/051753, filed on Jan. 21, 2016.

(30) Foreign Application Priority Data

Jan. 22, 2015  (JP) ................. 2015-010037
Jul. 8, 2015   (JP) ................. 2015-137170

(51) Int. Cl.
*B32B 3/30*      (2006.01)
*B32B 15/12*     (2006.01)
(Continued)

(52) U.S. Cl.
CPC ............. *B32B 3/30* (2013.01); *B32B 3/28* (2013.01); *B32B 7/12* (2013.01); *B32B 13/08* (2013.01);
(Continued)

(58) Field of Classification Search
CPC ... B32B 27/10; B32B 2255/26; B32B 27/302; B32B 2307/554; B32B 2307/4023;
(Continued)

(56) References Cited

FOREIGN PATENT DOCUMENTS

JP    62-114731 U1    7/1987
JP    H08-132582 A    5/1996
(Continued)

OTHER PUBLICATIONS

Machine translation of JP S62-114731 U; Publication Jul. 1987.*
(Continued)

*Primary Examiner* — Vishal I Patel
(74) *Attorney, Agent, or Firm* — Foley & Lardner LLP

(57) ABSTRACT

A method for manufacturing a cosmetic sheet, the method including a preparation step for preparing a pair of base papers containing 50% by mass or more of cellulose fiber, and having a thickness of no less than 15 μm but less than 60 μm; a laminating step for arranging a thermoplastic resin layer having a melting point of 100° C. to 200° C. and thickness of 20 to 70 μm between the pair of base papers, and adhering together the base papers using the thermoplastic resin layer to form a laminate; and a processing step for passing the laminate between an embossing roll having a maximum depth of 15 μm or greater, and a rubber back roll having a hardness of no less than 50° but no greater than 95° that is measured on the basis of ISO 7619, and applying an embossed shape to the laminate.

12 Claims, 5 Drawing Sheets

(51) Int. Cl.
- *B32B 27/30* (2006.01)
- *B32B 27/40* (2006.01)
- *B32B 29/00* (2006.01)
- *B32B 3/28* (2006.01)
- *B32B 13/08* (2006.01)
- *B32B 27/34* (2006.01)
- *B32B 21/02* (2006.01)
- *B32B 21/14* (2006.01)
- *B32B 27/36* (2006.01)
- *B32B 21/06* (2006.01)
- *B32B 23/06* (2006.01)
- *B32B 33/00* (2006.01)
- *B32B 23/20* (2006.01)
- *B32B 7/12* (2006.01)
- *B32B 27/10* (2006.01)
- *B32B 27/32* (2006.01)
- *B32B 38/06* (2006.01)
- *B32B 38/00* (2006.01)

(52) U.S. Cl.
CPC .............. *B32B 15/12* (2013.01); *B32B 21/02* (2013.01); *B32B 21/06* (2013.01); *B32B 21/14* (2013.01); *B32B 23/06* (2013.01); *B32B 23/20* (2013.01); *B32B 27/10* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/365* (2013.01); *B32B 27/40* (2013.01); *B32B 29/00* (2013.01); *B32B 33/00* (2013.01); *B32B 38/06* (2013.01); *B32B 38/145* (2013.01); *B32B 2250/03* (2013.01); *B32B 2250/04* (2013.01); *B32B 2255/12* (2013.01); *B32B 2255/26* (2013.01); *B32B 2255/28* (2013.01); *B32B 2307/406* (2013.01); *B32B 2307/4023* (2013.01); *B32B 2307/412* (2013.01); *B32B 2307/54* (2013.01); *B32B 2307/554* (2013.01); *B32B 2307/718* (2013.01); *B32B 2307/732* (2013.01); *B32B 2307/75* (2013.01); *B32B 2451/00* (2013.01)

(58) Field of Classification Search
CPC ......... B32B 13/08; B32B 3/30; B32B 38/145; B32B 21/06; B32B 21/14; B32B 2307/406; B32B 27/34; B32B 27/308; B32B 27/40; B32B 2307/75; B32B 2307/54; B32B 2307/732; B32B 27/32; B32B 7/12; B32B 2255/28; B32B 23/06; B32B 2307/412; B32B 3/28; B32B 27/306; B32B 2250/03; B32B 21/02; B32B 23/20; B32B 29/00; B32B 27/304; B32B 2307/718; B32B 2451/00; B32B 2255/12; B32B 2250/04; B32B 27/365; B32B 33/00; B32B 38/06; B32B 15/12
See application file for complete search history.

(56) References Cited

FOREIGN PATENT DOCUMENTS

| | | |
|---|---|---|
| JP | 10-315326 A | 12/1998 |
| JP | 2005-194295 A | 7/2005 |

OTHER PUBLICATIONS

Translation of JP H10 315326 A; Publication Dec. 1998.*
Equivalent Paper weight and thickness; Publication Dec. 2014.*
Equivalent Paper Weight and Thickness, Dec. 2014, XP055499737.
European Office Action dated Feb. 1, 2019 in corresponding application No. 16740268.4.
Extended European Search Report dated Aug. 22, 2018 in corresponding application No. 16740268.4.
International Search Report and Written Opinion for International Application No. PCT/JP2016/051753 dated Apr. 26, 2016 with English-language translations.

* cited by examiner

METHOD FOR MANUFACTURING COSMETIC SHEET, COSMETIC SHEET, METHOD FOR MANUFACTURING COSMETIC PANEL, AND COSMETIC PANEL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/051753, filed on Jan. 21, 2016, which is based upon and claims the benefit of priority of Japanese Patent Application No. 2015-010037, filed on Jan. 22, 2015, and Japanese Patent Application No. 2015-137170, filed Jul. 8, 2015, the entireties of which are hereby incorporated by reference.

TECHNICAL FIELD

The present invention relates to a method for manufacturing a cosmetic sheet, a cosmetic sheet, a method for manufacturing a cosmetic panel and a cosmetic panel. More specifically, the present invention relates to a method for manufacturing a cosmetic sheet on which printing of a pattern for general decorative materials or for surface decoration of assembled furniture and the like is performed, and unevenness is provided on the surface thereof, a cosmetic sheet, a method for manufacturing a cosmetic panel and a cosmetic panel.

BACKGROUND

Conventionally, cosmetic sheets for which the designability and durability have been improved by performing lamination or an embossing process of transparent film on a printed thermoplastic resin film have been achieved and are widely used.

In this case, in order to further improve designability, unevenness is formed on the surface of the cosmetic sheet by performing an embossing process, or by adjusting the glossiness. An embossing process is performed by passing a heated sheet having plasticity between an embossing plate (embossing roll) that has an uneven surface and a back roll (rubber back roll) that is made of rubber.

However, printed paper may be used as the cosmetic sheet or cosmetic paper. Furthermore, a method is known in which printing is performed on base paper, and then heat and pressure are applied by a press that has been impregnated with thermosetting resin to form a cosmetic panel. In this case, it is possible to improve the surface hardness and the abrasion resistance by having thermosetting resin on those surfaces. Moreover, in this case, by using a press plate having unevenness when performing pressing, it is possible to provide unevenness on the surface of the cosmetic sheet or cosmetic panel.

Alternatively, a cosmetic sheet for which the durability is improved by performing printing on comparatively thin paper and then applying a resin coating to that surface is typically known as so-called coated paper. Coated paper is inexpensive and is excellent in productivity. However, it is not easy to apply unevenness to the surface of coated paper. Presuming that it is intended that unevenness be applied to the surface of coated paper using an embossing roll, there is a method of passing a coated sheet between an embossing roll and a rubber back roll having unevenness that engages with the unevenness of the embossing roll. However, in this method, the flexibility and stretchability of the base paper is insufficient, production is difficult, and this method cannot be said to be satisfactory from the aspect of designability as well.

Particularly, in order to provide physical unevenness on a cosmetic sheet that uses base paper that is 50% or more cellulose fiber, it is necessary to use a so-called male-female embossing unit. Moreover, there is a problem in that a rubber back roll that has unevenness so as to engage with the unevenness of the embossing roll is expensive.

As a countermeasure, it is possible to insert a large amount of thermoplastic resin into the base paper. However, the paper requires special specifications, and is not economical.

PTL 1 proposes providing an extruding layer of thermoplastic resin between thin papers. However, the purpose of this is to obtain a surface finish having a painted style, and the main aim is not to obtain an uneven effect on the surface.

CITATION LIST

Patent Literature

[PTL 1] JP-A-H08-132582

SUMMARY OF THE INVENTION

Technical Problem

Taking the situation described above into consideration, the object of the present invention is to provide a manufacturing method for more inexpensively manufacturing cosmetic sheet having a good uneven shape by using base paper that is 50% or more cellulose fiber, and without using a male-female embossing unit, and to provide a cosmetic sheet and cosmetic panel using that manufacturing method.

Taking the above into consideration, an object of the present invention is to provide an image producing device, a transfer ribbon and an image producing method that can lower and even minimize costs for producing an image by an intermediate transfer method.

Solution to Problem

According to an aspect of the present invention, a method for manufacturing a cosmetic sheet includes: a preparation step for preparing a pair of base papers that include cellulose fiber at 50% by mass or more, and have a thickness of 15 μm or more but less than 60 μm; a laminating step for forming a laminate by arranging a thermoplastic resin layer having a melting point of no less than 100° C. and no greater than 200° C. and having a thickness of no less than 20 μm and no greater than 70 μm between the pair of base papers, and adhering together the pair of base papers using the thermoplastic resin layer; and a processing step of applying an embossed shape to the laminate by passing the laminate between an embossing roll having a maximum depth of 15 μm or greater and a rubber back roll having a hardness of 50° or greater but less than 95° that is measured based on ISO 7619. Moreover, the hardness of the rubber back roll that is measured based on ISO 7619 may also be no less than 50° and no greater than 65°.

In this method for manufacturing a cosmetic sheet, an embossing process is performed on the laminate that is formed by adhering together the pair of base papers that include cellulose fiber at 50% by mass or greater using the thermoplastic resin layer by using the embossing roll having a depth of 15 μm or more, and the rubber back roll having a hardness of 50° or greater but less than 95° that is measured based on ISO 7619. In this case, the embossing process is performed using a rubber back roll having a lower hardness than normal, so it is possible to apply a good embossed shape even though the base papers include cellulose fiber at 50% by mass or greater. Moreover, an uneven shape is applied to the rear surface as well as the front surface of the laminate, so an even better outward appearance can be obtained. Therefore, it is possible to provide a manufacturing method for inexpensively manufacturing a cosmetic sheet having a good uneven shape by using the base papers that include cellulose fiber at 50% by mass or greater without using a male-female embossing unit. Furthermore, by making the hardness of the rubber back roll that is measured based on ISO 7619 no less than 50° and no greater than 65°, it becomes possible to exhibit the effect described above even more suitably.

Moreover, the method for manufacturing a cosmetic sheet described above can further include a printing step for providing a printed pattern layer on a surface of one of the pair of base papers.

Moreover, in the method for manufacturing a cosmetic sheet described above, inkjet printing may be performed on a surface of the laminate before or after the processing step. By performing inkjet printing, it is possible to apply a pattern before or after applying the embossed shape. As a result, it is possible to manufacture a cosmetic sheet having a high degree of designability.

According to another aspect of the present invention, a method for manufacturing a cosmetic sheet for which printing is performed on a base paper and having embossment on a surface thereof, wherein a pattern is printed on the surface using the base paper that includes cellulose fiber at 50% by mass or greater and has a thickness of 15 µm or more but less than 60 µm; and an embossed shape is applied to a laminate that is formed by laminating one more base paper to the surface of the base paper opposite from the printed pattern layer by way of a thermoplastic resin layer having a melting point of no less than 100° C. and no greater than 200° C. and having a thickness of no less than 20 µm and no greater than 70 µm, by passing that laminate between an embossing roll having a maximum depth of 15 µm or greater and a rubber back roll having a hardness of 50° or greater but less than 95° (ISO 7619). In this case as well, as in the case described above, it is possible to apply a good embossed shape.

Moreover, a method for manufacturing a cosmetic panel according to an aspect of the present invention includes: a cosmetic sheet preparation step for preparing a cosmetic sheet that is manufactured using the method for manufacturing a cosmetic sheet described above; and an adhering step for adhering the cosmetic sheet to at least one surface of a base material. With this method for manufacturing a cosmetic panel, as in the case of the method for manufacturing a cosmetic sheet, it is possible to exhibit the effects described above.

Furthermore, the present invention can also be regarded as an invention of a cosmetic sheet that is manufactured using the method for manufacturing a cosmetic sheet described above. With this cosmetic sheet, as in the case of the method for manufacturing a cosmetic sheet, it is possible to exhibit the effects described above.

Furthermore, the present invention can also be regarded as an invention of a cosmetic panel that includes the configuration of the cosmetic sheet described above. With this cosmetic panel, as in the case of the method for manufacturing a cosmetic sheet, it is possible to exhibit the effects described above.

Advantageous Effects of the Invention

With the present invention, it is possible to provide a manufacturing method for inexpensively manufacturing cosmetic sheet having a good uneven shape by using base paper having cellulose fiber at 50% by mass or greater and without using a male-female embossing unit, and it is possible to provide a cosmetic sheet and a cosmetic panel that are manufactured by that manufacturing method.

DESCRIPTION OF REPRESENTATIVE EMBODIMENTS

In the following, embodiments of the present invention will be explained in detail with reference to the drawings. However, it should be understood that these embodiments of the present invention are illustrative and representative of the present invention. The present invention is not necessarily limited to these embodiments.

Figure 1:
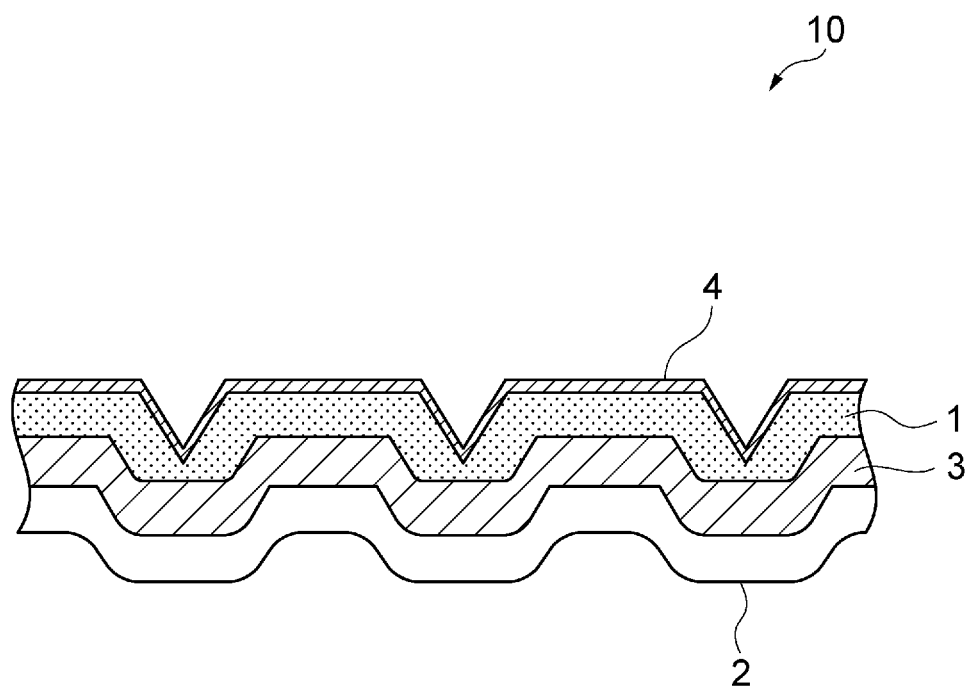
FIG. 1 is a partial cross-sectional view of an embodiment of a cosmetic sheet of the present invention.

FIG. 1 is a partial cross-sectional view of an embodiment of a cosmetic sheet of the present invention. As illustrated in FIG. 1, a printed pattern layer 4 is provided on a base paper 1 of a cosmetic sheet 10. The base paper 1 is layered with a base paper 2 via a thermoplastic resin layer 3. The laminate is such that unevenness is formed on the surface thereof by performing an embossing process to form the cosmetic sheet 10. In the present invention, the laminate is heated, and unevenness is applied by passing the laminate though an embossing unit that includes an embossing roll and a rubber back roll. The laminate can be provided with plasticity by being heated. Moreover, the tensile strength of the laminate can be increased by having the thermoplastic resin layer 3. This improves the embossing suitability of the laminate.

Figure 2:
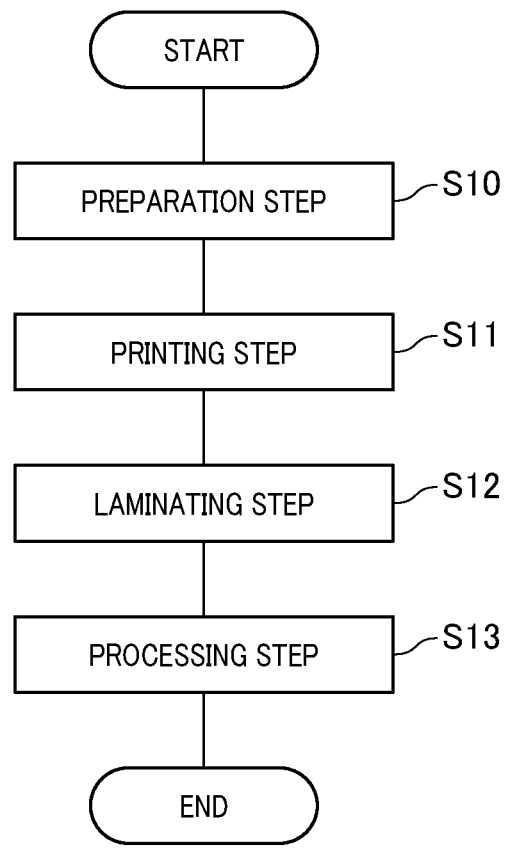
FIG. 2 is a flowchart of the manufacturing method for a cosmetic sheet.

Next, the method for manufacturing a cosmetic sheet 10 will be explained. FIG. 2 is a flowchart of a method for manufacturing a cosmetic sheet. First, a pair of base papers 1, 2 is prepared (preparation step: step S10). As the base paper 1 and base paper 2, paper that includes cellulose fiber at 50% by mass or greater is used. The thickness of the base papers 1, 2 is 15 µm or greater and less than 60 µm. When the thickness of the base papers 1, 2 is thinner than this range, the papers are not suitable for printing and post-processing in terms of strength. When the thickness of the base papers 1, 2 is thicker than this range, the papers can be less or not suitable for the embossing process.

A printed pattern layer 4 is provided on the surface of the base paper 1 (printing step: step S11). As the printing method for providing the printed pattern layer 4 it is possible to use a known printing method, and known printing device. The method is not particularly limited; however, from the aspect of productivity, for example, it is possible to use a gravure printing method, a transfer method, or an inkjet method.

The printing device for providing a printed pattern layer 4 on the base paper 1 using an inkjet method is not particularly limited as long as the device is a typical inkjet printer. For example, as the inkjet printer it is possible to use various kinds of inkjet printers such as a fixed-head type printer (for example, a line type, or single-pass type) or a movable-head type printer (for example, a serial-head type).

The printing ink is not particularly limited. The printing ink can be water-based ink or solvent type ink, and should be appropriately selected taking into consideration compatibility with the device and the performance desired for the cosmetic sheet 10 and cosmetic panel. Generally, taking light fastness into consideration, preferably a pigment type colorant is used as the colorant that is included in the ink.

As the ink that is used in a copying method, it is possible to use ink that includes a resin such as an acrylic resin, a vinyl chloride resin-vinyl acetate resin copolymer, a polyester resin, a polyvinyl butyral resin, or a urethane resin and the like.

As the ink that is used in the inkjet method (inkjet ink), it is possible to use a water-based ink, a solvent based ink, or a UV ink and the like. From the aspect of adhesion of the inkjet ink to the base paper 1, and the designability of the printed pattern layer 4 that is printed, using a UV ink is particularly preferred. Moreover, as the inkjet ink, it is also possible to use an ink that includes an active hydrogen group.

It is also possible to obtain the preferred designability by adjusting the glossiness of the surface by further providing a transparent resin on top of the printed pattern layer 4. A coating layer may also be provided with the purpose of improving the surface properties such as abrasion resistance and the like. Moreover, on the coating layer, it is also possible to partially provide differences in glossiness such as in the conduit portion of wood grain. As a result, it is possible to visually create a sense of unevenness, and to express a higher degree of designability by combining that sense of unevenness with the unevenness provided by embossing.

In order to provide a coating layer, a known coating device can be used, or a gravure printing device could also be used. The transparent resin is not particularly limited; however, it is possible, for example, to use silica that is dispersed in a two-liquid curable type urethane resin in order to adjust the glossiness.

Continuing, a thermoplastic resin layer 3 is arranged between the pair of base papers 1, 2, and this thermoplastic resin layer 3 is laminated with the pair of base papers 1, 2 to form a laminate (laminating step: step S12). The thermoplastic resin layer 3 is located between the pair of base papers 1, 2 and is part of the laminate. The thermoplastic resin layer 3 is formed by using an extrusion machine, and can be adhered to both base paper 1 and base paper 2. The thickness of the thermoplastic resin layer 3 is preferably no less than 20 μm and no greater than 70 μm.

The melting point of the thermoplastic resin of the thermoplastic resin layer 3 is preferably no less than 100° C. and no greater than 200° C. With the melting point of the thermoplastic resin of the thermoplastic resin layer 3 in the range of no less than 100° C. and no greater than 200° C., it is possible to perform the embossing process without causing thermal degradation of the paper, and without a loss of productivity such as a loss of line speed. The thermoplastic resin of the thermoplastic resin layer 3 can be appropriately selected by taking the melting point into consideration. As a thermoplastic resin having a melting point that is no less than 100° C. and no greater than 200° C. there is for example, polyvinyl chloride, polyvinylidene fluoride, nylon 12, polyamide, polyvinyl alcohol, polystyrene, styrene-acrylonitrile copolymer, styrene-butadiene-acrylonitrile copolymer, high-density polyethylene, medium density polyethylene, low-density polyethylene, polypropylene, ethylene-vinyl acetate copolymer, polyacetal, polymethyl methacrylate, modified acrylic, polycarbonate, polyacetal, nitrocellulose, cellulose propionate, ethylcellulose, cellulose acetate, polyurethane and the like.

When taking into consideration the price of resin and liquidity during melting, it is particularly preferable to use, for example, high-density polyethylene, medium density polyethylene, low-density polyethylene and the like as the thermoplastic resin of the thermoplastic resin layer 3.

Figure 3:
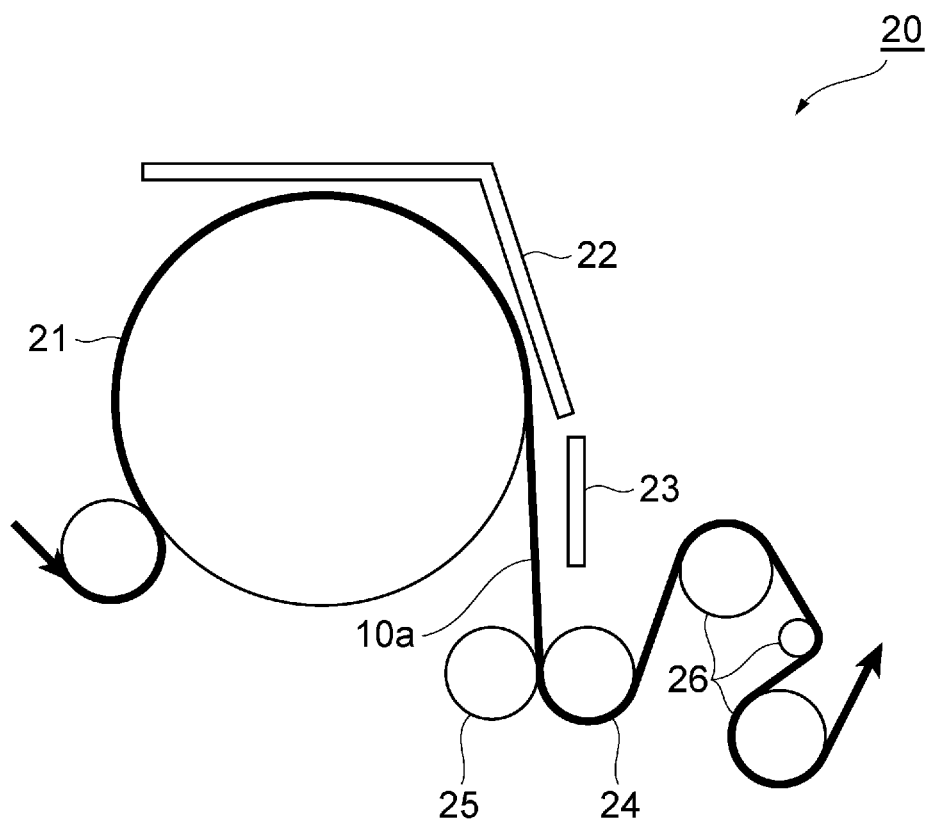
FIG. 3 is a schematic drawing of the configuration of an embossing device.

An embossing process is performed on the laminate that is obtained in this way using an embossing device (processing step: step S13). FIG. 3 is a schematic drawing of the configuration of an embossing device. As shown in FIG. 3, the embossing device 20 includes a main heating drum 21, an infra-red heater 22, a bar heater 23, an embossing roll 24, a rubber back roll 25 and a take-off roll 26.

The main heating drum 21 has a cylindrical shape, and is able to rotate around a center axis. The laminate 10a that is supplied to the embossing device 20 first advances by being wound around the outer circumference of the main heating drum 21. The infra-red heater 22 is arranged near the main heating drum 21 along part of the outer circumference of the main heating drum 21. The laminate 10a is heated by the infra-red heater 22 while advancing toward the downstream side as the main heating drum 21 rotates.

The bar heater 23 is a heater for further heating the laminate 10a that is fed toward the downstream side from the main heating drum 21. The bar heater 23 is arranged along the area where the laminate 10a advances between the main heating drum 21 and the embossing roll 24 and rubber back roll 25.

The embossing roll 24 and the rubber back roll 25 form an embossing unit, and by cooperating with each other, perform an embossing process on the laminate 10a. The embossing roll 24 and rubber back roll 25 are arranged on the downstream side from the main heating drum 21. Both the embossing roll 24 and the rubber back roll 25 have a cylindrical shape, and are able to rotate around the respective center axes. The embossing roll 24 and rubber back roll 25 are such that the outer circumferences come in contact with each other, and as the laminate 10a passes between these outer circumferences, the embossing roll 24 and rubber back roll 25 perform an embossing process on the laminate 10a. The detailed configuration of the embossing roll 24 and rubber back roll 25 will be described later.

The take-off roll 26 is arranged on the downstream side from the embossing roll 24 and rubber back roll 25, and discharges the laminate 10a that has passed the embossing roll 24 and rubber back roll 25 (in other words, the cosmetic sheet 10 that has undergone the embossing process) from the embossing device 20.

As described above, the embossing device 20 has a main heating drum 21 for heating the laminate 10a, an infra-red heater 22, and a bar heater 23. Moreover, the embossing device 20 has an embossing unit that includes an embossing roll 24 and a rubber back roll 25 that have unevenness on the respective surfaces. The embossing device 20 performs an embossing process on the laminate 10a, by sandwiching the heated laminate 10a between the embossing roll 24 and a rubber back roll 25, and passing the heated laminate 10a between the embossing roll 24 and a rubber back roll 25. By heating the laminate 10a, the thermoplastic resin layer 3 becomes soft, and it becomes easy to apply an embossing shape to the laminate 10a. Moreover, the thermoplastic resin layer 3 that is positioned between the base paper 1 and the base paper 2 becomes soft, so the tensile strength of the laminate 10a increases, and it becomes difficult for the laminate 10a to break. As the rubber back roll 25 it also possible to use a rubber back roll 25 having a flat surface.

Figure 4:
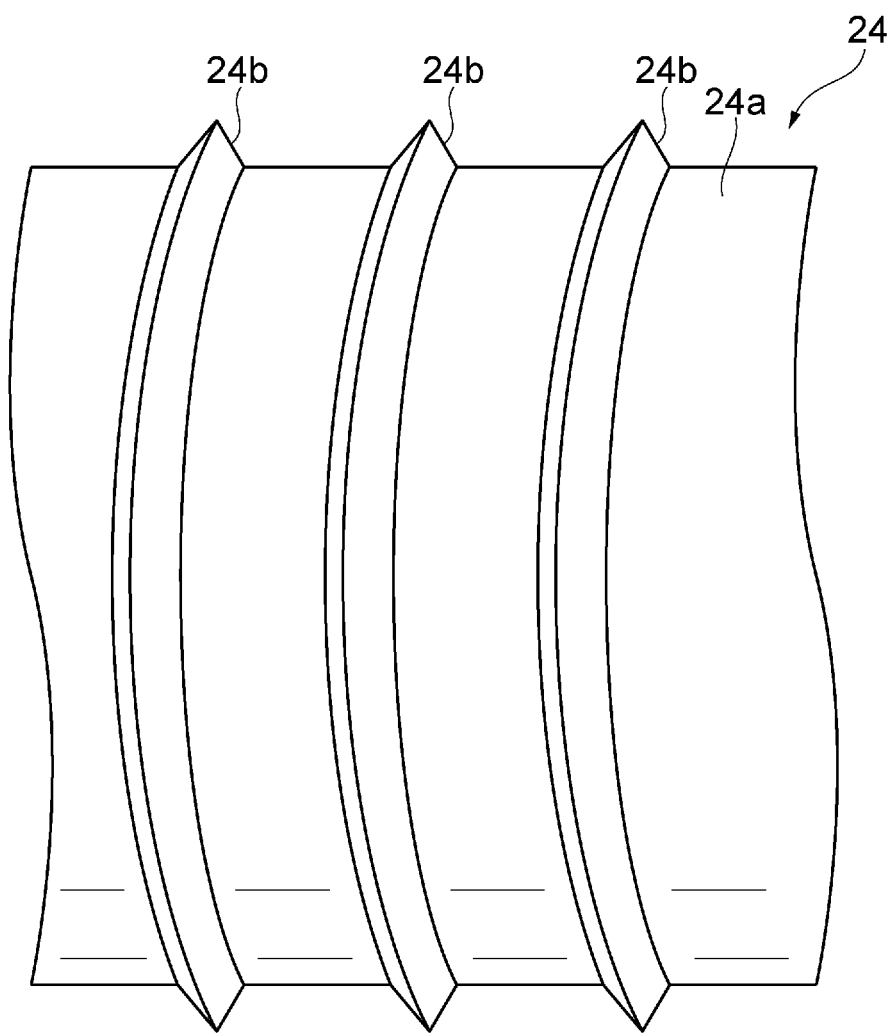
FIG. 4 schematically illustrates convex portions on the surface of an embossing roll.

FIG. 4 schematically illustrates convex sections on the surface of an embossing roll. As illustrated in FIG. 4, the embossing roll 24 has plural convex sections 24b on the surface 24a thereof that extend along the circumferential direction, for example. FIG. 4 illustrates convex sections 24b that have a triangular shaped cross section in the circumferential direction. The cross section in the circumferential direction of the convex sections 24b is not limited to being a triangular shape, and, for example, may also be a trapezoidal shape or rectangular shape. In the explanation below, the height of the convex section 24b that is formed so as to be the highest in the radial direction from the surface 24a is called the "depth of the embossing roll 24 (maximum depth)". The embossing process is performed using an embossing roll 24 having a depth of 15 μm or greater. As a result, the embossment has a sense of unevenness in the design, and is effectively perceived visually.

The hardness of the rubber back roll 25 is 50° and greater and less than 95°. The hardness referred to here is measured based on ISO 7619. More preferably, a rubber back roll 25 having a hardness that is 65° or less is used, and even more preferably a rubber back roll 25 having a hardness of 50° is used. However, in the case of using a rubber back roll 25 having a hardness of 95°, the designability of the embossment becomes significantly inferior. The hardness of the rubber back roll 25 can also be measured based on JIS K 6301 A or JIS K 6253, and the hardness that is measured based on these standards is equivalent to the hardness that is measured based on ISO 7619.

The laminate 10a that underwent an embossing process further undergoes inkjet printing on the surface thereof. As the inkjet printer and the inkjet ink it is possible to use the same printer and ink described above. This inkjet printing is performed over the printed pattern layer 4 that has already been provided on the surface of the laminate 10a, and as a whole forms a printed pattern layer 4.

Figure 5:
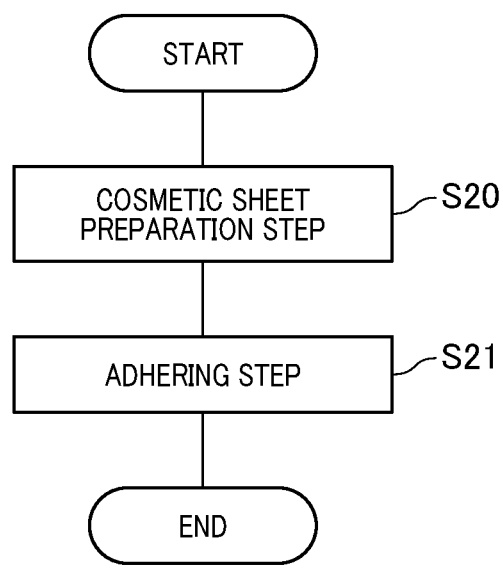
FIG. 5 is a flowchart of the manufacturing method for a cosmetic panel.

The laminate 10a for which the embossing process is finished and to which unevenness is applied becomes the cosmetic sheet 10 of this embodiment. Moreover, a cosmetic panel of this embodiment is obtained by adhering this cosmetic sheet 10 to the base material using an adhesive. FIG. 5 is a flowchart of the manufacturing method for a cosmetic sheet 10. It is possible to obtain a cosmetic panel by preparing the cosmetic sheet 10 using the manufacturing method for a cosmetic sheet described above (cosmetic sheet preparation step: step S20), and adhering the cosmetic sheet 10 to at least one surface of a base material (adhering step: step S21). As the base material it is possible to use, for example, wood type MDF, plywood or particle board, inorganic type gypsum board, or metal plate and the like.

The present invention is not limited to the embodiment described above. For example, in the embodiment described above, inkjet printing was performed on the surface of the laminate 10a after the embossing process step; however, inkjet printing may also be performed before the embossing process step.

Moreover, the manufacturing method for a cosmetic sheet 10 of the embodiment described above has a printing step for printing a pattern, however, the method does not have to have this printing step. In that case, the laminate 10a includes base papers 1 and 2 and a thermoplastic resin layer 3. Therefore, when inkjet printing is performed on the surface of the laminate 10a before or after the embossing process on the laminate 10a, the inkjet printing is performed directly on the surface of the base paper 1.

EXAMPLES

The present invention will be explained in further detail using examples and comparative examples. However, the present invention is not limited to only these examples.

Example 1

A cosmetic sheet and a cosmetic panel that uses that cosmetic sheet were made with the materials and procedure below.

(1) A pattern is printed on the surface of mixed paper (TP23 manufactured by Tentok Paper Co., Ltd.) that has a weight of 23 g/m$^2$ (33 μm thickness) and includes cellulose fiber at 50% by mass or greater using a nitrified cotton ink (PCNT ink, manufactured by Toyo Ink Co., Ltd.) and urethane ink (PCRNT ink, manufactured by Toyo Ink Co., Ltd.). Furthermore, a transparent surface protective coating having an isocyanate curing agent added to a main agent that includes acrylic polyol as a main component and having a dry weight of 7 g/m$^2$ was performed on the surface of the mixed paper. As a result, base paper having a pattern was made.

(2) A hardening reaction of the surface protective layer was promoted by performing a curing process of the patterned base paper on which pattern printing was performed at 60° C. for 48 hours. After that, high-density polyethylene was heated to 300° C. and hot melted, then pressed into a film shape and pressed between the side of the patterned base paper on which printing was not performed and mixed paper that has a weight of 23 g/m$^2$ (30 μm thickness) and includes cellulose fiber at 50% by mass or greater (FIXW23, manufactured by Oji Paper Co., Ltd.), then was immediately cooled. As a result, a pre-embossed laminate (laminate) having a base paper layer on the front and back of a polyethylene layer (thermoplastic resin layer) was obtained. The thickness of the polyethylene layer was 50 μm, and the total thickness of the laminate before the embossing process was 116 μm.

(3) The obtained pre-embossed laminate was heated until the surface temperature of the printed pattern surface reached 130° C. near the melting point of polyethylene. An uneven shape was applied to the pre-embossed laminate by sandwiching the pre-embossed laminate between an embossing roll that was made by a corrosion method and that has a maximum depth of 150 μm and a rubber back roll having a hardness HS (Hardness Spring) of 50° measured by a hardness tester according to JIS K 6301 Type A (also equivalent to ISO 7619, the same is also true below), and then cooling afterwards. As a result, a cosmetic sheet was made having an uneven shape. The unevenness of the obtained cosmetic sheet had a maximum difference between the high and low of 70.1 μm, and good designability was confirmed.

(4) A liquid ethylene vinyl acetate emulsion adhesive was applied to a 2.5 mm thick MDF (medium density fiber) base material at a coating liquid weight of 55 g/m$^2$, then the obtained cosmetic sheet was adhered to the MDF base material using a laminating roll that was heated to a surface temperature of 100° C. As a result, a cosmetic panel having an uneven shape was formed. The unevenness of the obtained cosmetic panel was a maximum of 59.0 µm, and a cosmetic panel having good designability could be made.

Example 2

A cosmetic sheet and a cosmetic panel that uses that cosmetic sheet were made with the materials and procedure below.

(1) Except for using mixed paper (HP45, manufactured by Tentok Paper Co., Ltd.) having a thickness of 52 µm as the base paper, a patterned base paper having a pattern printed on the surface thereof and coated with a surface protective coating was made using the same materials and same procedure as in (1) of Example 1.

(2) A pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 42.4 µm, and good designability was confirmed.

(4) A cosmetic panel was made using the same materials and same procedure as in (4) of Example 1. A cosmetic panel having good unevenness and designability could be made.

Example 3

A cosmetic sheet and a cosmetic panel that uses that cosmetic sheet were made with the materials and procedure below.

(1) Except for using mixed paper (HP45, manufactured by Tentok Paper Co., Ltd.) having a thickness of 52 µm as the base paper, a patterned base paper having a pattern printed on the surface thereof and coated with a surface protective coating was made using the same materials and same procedure as in (1) of Example 1.

(2) Except for using mixed paper (HPS45, manufactured by Oji Paper Co., Ltd.) having a thickness of 55 µm as the base paper, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 21.1 µm, and good designability was confirmed.

(4) A cosmetic panel was made using the same materials and same procedure as in (4) of Example 1. A cosmetic panel having good unevenness and designability could be made.

Example 4

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) Except for changing the thickness of the polyethylene layer from 50 µm to 24 µm, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 70.5 µm, and good designability was confirmed.

(4) A cosmetic panel was made using the same materials and same procedure as in (4) of Example 1. A cosmetic panel having good unevenness and designability could be made.

Example 5

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) Except for changing the thickness of the polyethylene layer from 50 µm to 66 µm, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 67.2 µm, and good designability was confirmed.

(4) A cosmetic panel was made using the same materials and same procedure as in (4) of Example 1. A cosmetic panel having good unevenness and designability could be made.

Example 6

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) A pre-embossed laminate having base paper layers on the front and back of a thermoplastic resin layer was made using the same materials and procedure as in (2) of Example 1.

(3) Except for using a rubber back roll having a hardness of 60°, an embossing process was performed on the pre-embossed laminate using the same materials and procedure as in (3) of Example 1. The unevenness of the obtained cosmetic sheet had a maximum difference between high and low of 52.3 µm, and good designability was confirmed.

(4) A cosmetic panel was made using the same materials and same procedure as in (4) of Example 1. A cosmetic panel having good unevenness and designability could be made.

Example 7

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) A pre-embossed laminate having base paper layers on the front and back of a thermoplastic resin layer was made using the same materials and procedure as in (2) of Example 1.

(3) Except for using a rubber back roll having a hardness of 94°, an embossing process was performed on the pre-embossed laminate using the same materials and procedure as in (3) of Example 1. The unevenness of the obtained cosmetic sheet had a maximum difference between high and low of 28.5 μm, and good designability was confirmed.

(4) A cosmetic panel was made using the same materials and same procedure as in (4) of Example 1. A cosmetic panel having good unevenness and designability could be made.

Comparative Example 1

A cosmetic sheet was made with the materials and procedure below.

(1) Except for using mixed paper (HC50, manufactured by Tentok Paper Co., Ltd.) having a thickness of 60 μm as the base paper, a patterned base paper having a pattern printed on the surface thereof and coated with a surface protective coating was made using the same materials and same procedure as in (1) of Example 1.

(2) Except for using mixed paper (HC50, manufactured by Oji Paper Co., Ltd.) having a thickness of 60 μm as the base paper, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 9.5 μm, and designability was poor.

(4) The designability of the cosmetic sheet was poor, so a cosmetic panel was not made.

Comparative Example 2

A cosmetic sheet and a cosmetic panel that uses that cosmetic sheet were made with the materials and procedure below.

(1) Except for using mixed paper having a thickness of 12 μm as the base paper, a patterned base paper having a pattern printed on the surface thereof and coated with a surface protective coating was made using the same materials and same procedure as in (1) of Example 1.

(2) Except for using mixed paper having a thickness of 10 μm as the base paper, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 44.7 μm, and good designability was confirmed. However, the suitability of the embossing process was poor.

(4) A cosmetic panel was made using the same materials and same procedure as in (4) of Example 1, however, because the base paper was thin, unevenness during lamination failed.

Comparative Example 3

A cosmetic sheet was made with the materials and procedure below.

(1) A patterned base paper having a pattern printed on the surface thereof and coated with a surface protective coating was made using the same materials and same procedure as in (1) of Example 1.

(2) Except for using polybutylene terephthalate (melting point 240° C.) instead of high-density polyethylene as the thermoplastic resin, and melting the polybutylene terephthalate at 350° C., a pre-embossed laminate having base paper layers on the front and back of a thermoplastic resin layer was made using the same materials and procedure as in (2) of Example 1.

(3) In the embossing process step, an embossing effect could not be obtained unless the surface temperature was heated to 200° C. or greater. Moreover, at this temperature, swelling occurred due to the moisture included in the base paper, so the embossing process could not be performed.

(4) The embossing process was not performed and a cosmetic sheet could not be made, so a cosmetic panel was not be made.

Comparative Example 4

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) Except for changing the thickness of the polyethylene layer from 50 μm to 18 μm, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 72.3 μm, and good designability was confirmed.

(4) A cosmetic panel was made using the same materials and same procedure as in (4) of Example 1, however, because the thermoplastic resin layer was thin, unevenness was lost during lamination.

Comparative Example 5

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) Except for changing the thickness of the polyethylene layer from 50 μm to 78 μm, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 67.2 μm, and good designability was confirmed. However, the speed of the embossing process was lower than the speed of the embossing process in (3) of Example 1.

(4) A cosmetic panel was made using the same materials and same procedure as in (4) of Example 1. A cosmetic panel having good unevenness and designability could be made.

Comparative Example 6

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) Except for changing the thickness of the polyethylene layer from 50 μm to 90 μm, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 69.9 μm, and good designability was confirmed. However, the speed of the embossing process was lower than the processing speed in (3) of Example 1.

(4) A cosmetic panel was made using the same materials and same procedure as in (4) of Example 1. A cosmetic panel having good unevenness and designability could be made.

Comparative Example 7

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) Except for changing the thickness of the polyethylene layer from 50 μm to 105 μm, a pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 72.7 μm, and good designability was confirmed. However, the speed of the embossing process was much lower than the processing speed in (3) of Example 1.

(4) A cosmetic panel was made using the same materials and same procedure as in (4) of Example 1. A cosmetic panel having good unevenness and designability could be made.

Comparative Example 8

A cosmetic sheet and a cosmetic panel that uses that cosmetic sheet were made with the materials and procedure below.

(1) A patterned base paper having a pattern printed on the surface thereof and coated with a surface protective coating was made using the same materials and same procedure as in (1) of Example 1.

(2) A pre-embossed laminate having base paper layers on the front and back of a thermoplastic resin layer was made using the same materials and procedure as in (2) of Example 1.

(3) Except for using a rubber back roll having a hardness of 40°, an embossing process was performed on the pre-embossed laminate using the same materials and procedure as in (3) of Example 1. The unevenness of the obtained cosmetic sheet had a maximum difference between high and low of 81.6 μm, however, the rubber back roll became severely worn, and the suitability of the embossing process was poor.

(4) A cosmetic panel was made using the same materials and same procedure as in (4) of Example 1. A cosmetic panel having good unevenness and designability could be made.

Comparative Example 9

A cosmetic sheet was made with the materials and procedure below.

(1) A patterned base paper having a pattern printed on the surface thereof and coated with a surface protective coating was made using the same materials and same procedure as in (1) of Example 1.

(2) A pre-embossed laminate having base paper layers on the front and back of a thermoplastic resin layer was made using the same materials and procedure as in (2) of Example 1.

(3) Except for using a rubber back roll having a hardness of 95°, an embossing process was performed on the pre-embossed laminate using the same materials and procedure as in (3) of Example 1. The unevenness of the obtained cosmetic sheet had a maximum difference between high and low of 20.9 μm, however, cracking occurred in the paper layers, so designability was poor.

(4) Cracking occurred in the paper layers due to the embossing process on the pre-embossed laminate, so a cosmetic panel was not made.

Comparative Example 10

A cosmetic sheet was made with the materials and procedure below.

(1) Except for using mixed paper (HP45, manufactured by Tentok Paper Co., Ltd.) having a thickness of 52 μm as the base paper, a patterned base paper having a pattern printed on the surface thereof and coated with a surface protective coating was made using the same materials and same procedure as in (1) of Example 1.

(2) A pre-embossed laminate having base paper layers on the front and back of a thermoplastic resin layer was made using the same materials and procedure as in (2) of Example 1.

(3) Except for using a rubber back roll having a hardness of 95°, an embossing process was performed on the pre-embossed laminate using the same materials and procedure as in (3) of Example 1. The unevenness of the obtained cosmetic sheet had a maximum difference between high and low of 11.8 μm, however, cracking occurred in the paper layers, so designability was poor.

(4) Cracking occurred in the paper layers due to the embossing process on the pre-embossed laminate, so a cosmetic panel was not made.

Comparative Example 11

A cosmetic sheet was made with the materials and procedure below.

(1) Except for using mixed paper (HP45, manufactured by Tentok Paper Co., Ltd.) having a thickness of 52 μm as the base paper, a patterned base paper having a pattern printed on the surface thereof and coated with a surface protective coating was made using the same materials and same procedure as in (1) of Example 1.

(2) Except for using mixed paper (HPS45, manufactured by Tentok Paper Co., Ltd.) having a thickness of 55 μm as the base paper, a pre-embossed laminate having base paper layers on the front and back of a thermoplastic resin layer was made using the same materials and procedure as in (2) of Example 1.

(3) Except for using a rubber back roll having a hardness of 95°, an embossing process was performed on the pre-embossed laminate using the same materials and procedure as in (3) of Example 1. The unevenness of the obtained cosmetic sheet had a maximum difference between high and low of 5.3 μm, however, cracking occurred in the paper layers, so designability was poor.

(4) Cracking occurred in the paper layers due to the embossing process on the pre-embossed laminate, so a cosmetic panel could not be produced.

The configuration and evaluation results of Examples 1 to 7 and Comparative Examples 1 to 11 are summarized in Table 1.

point of 240° C. for the thermoplastic resin layer. When a heat embossing process was performed on the obtained pre-embossed laminate, under these conditions, swelling occurred between the thermoplastic resin layer and the base paper due to moisture included in the base paper, and stable processing could not be performed. This was because in order to form a good uneven shape in the thermoplastic layer, the surface temperature of the sheet must be heated to 200° C. or greater. Moreover, the obtained cosmetic sheet was confirmed to have deterioration and discoloration of the base paper due to heat during processing, and change in the color tone of the pattern layer occurred.

In Example 4 and Comparative Example 4, high-density polyethylene was used for the thermoplastic resin layer, and pre-embossed laminates having thermoplastic resin layers with thicknesses of 24 μm and 18 μm, respectively, were

TABLE 1

| | Base Paper 1 Thickness (μm) | Thermoplastic Resin Type | Thermoplastic Resin Thickness | Base Paper 2 Thickness (μm) | Rubber Roll Hardness | High-Low Embossing Difference (μm) | Designability | Embossing Process Suitability | Laminate Suitability | Overall Evaluation |
|---|---|---|---|---|---|---|---|---|---|---|
| Example 1 | 33 | HDPE | 50 | 30 | 50° | 70.1 | Excellent | Good | Good | ○ |
| Example 2 | 52 | HDPE | 50 | 30 | 50° | 42.4 | Good | Good | Good | ○ |
| Example 3 | 52 | HDPE | 50 | 55 | 50° | 21.1 | Possible | Good | Good | Δ |
| Example 4 | 33 | HDPE | 24 | 30 | 50° | 70.5 | Excellent | Good | Good | ○ |
| Example 5 | 33 | HDPE | 66 | 30 | 50° | 67.2 | Excellent | Good | Good | ○ |
| Example 6 | 33 | HDPE | 50 | 30 | 60° | 52.3 | Good | Good | Good | ○ |
| Example 7 | 33 | HDPE | 50 | 30 | 94° | 28.5 | Possible | Good | * | Δ |
| Comparative Example 1 | 60 | HDPE | 50 | 60 | 50° | 9.5 | Poor | Good | Poor | x |
| Comparative Example 2 | 12 | HDPE | 50 | 10 | 50° | 44.7 | Good | Poor | * | x |
| Comparative Example 3 | 33 | PBT | 50 | 30 | 50° | * | * | Poor | Poor | x |
| Comparative Example 4 | 33 | HDPE | 18 | 30 | 50° | 72.3 | Excellent | Good | * | x |
| Comparative Example 5 | 33 | HDPE | 78 | 30 | 50° | 67.2 | Excellent | Poor | Good | x |
| Comparative Example 6 | 33 | HDPE | 90 | 30 | 50° | 69.9 | Excellent | Poor | Good | x |
| Comparative Example 7 | 33 | HDPE | 105 | 30 | 50° | 72.7 | Excellent | Poor | Good | x |
| Comparative Example 8 | 33 | HDPE | 50 | 30 | 40° | 81.6 | Excellent | Poor | Good | x |
| Comparative Example 9 | 33 | HDPE | 50 | 30 | 95° | 20.9 | Poor | Good | * | x |
| Comparative Example 10 | 52 | HDPE | 50 | 30 | 95° | 11.8 | Poor | Good | * | x |
| Comparative Example 11 | 52 | HDPE | 50 | 55 | 95° | 5.3 | Poor | Good | * | x |

In Table 1, the following abbreviations are used for the type of thermoplastic resin. In other words, HDPE indicates high-density polyethylene (melting point: 125° C.), and PBT indicates polybutylene terephthalate (melting point: 240° C.). Moreover, the notation "*" in Table 1 indicates that processing could not be performed, or that designability or the like of the outward appearance was poor and that further processing could not be performed.

In the overall evaluation, the results for Example 1 to Example 7 were good. In Example 1 to Example 3, and in Comparative Example 1 to Comparative Example 2, when high-density polyethylene was used for the thermoplastic resin layer, as the thickness of the base paper increased, there was a tendency for the difference between the high and low of the unevenness to decrease. For a base paper thickness of 60 μm, good designability of the embossment was not visually observed.

In Comparative Example 3, a pre-embossed laminate was made using polybutylene terephthalate having a melting made. A heat embossing process was performed on the obtained pre-embossed laminates. As a result, in Example 4 having a thermoplastic resin layer with a thickness of 24 μm, formation of a good uneven shape was confirmed, and the laminate suitability was also good. However, in Comparative Example 4 having a thermoplastic resin layer with a thickness of 18 μm, even though formation of a good uneven shape was confirmed, in a cosmetic panel that was made by adhering the cosmetic sheet to a MDF base material using a laminating roller, the uneven shape was lost due to hot pressure from the laminating roller.

In Example 5 and Comparative Example 5 to Comparative Example 7, high-density polyethylene was used for the thermoplastic resin layer, and pre-embossed laminates having thermoplastic resin layers with thicknesses of 66 μm, 78 μm, 90 μm and 105 μm, respectively, were made. A heat embossing process was performed on the obtained pre-embossed laminates. As a result, in Example 5 having a thermoplastic resin layer with a thickness of 66 µm, formation of a good uneven shape was confirmed, and the laminate suitability was also good. However, in Comparative Example 5 to Comparative Example 7 having thermoplastic resin layers with thicknesses of 78 µm, 90 µm and 105 µm, even though cosmetic sheets having a good uneven shape were obtained, it was necessary to reduce the speed of the heat embossing process in order to sufficiently heat the thermoplastic resin layer. Particularly, in Comparative Example 7, the processing speed was greatly reduced.

In Example 6 and Example 7, rubber back rolls having a hardness of 60° and 94° respectively were used. Moreover, high-density polyethylene was used for the thermoplastic resin layer, and an embossing process was performed on the pre-embossed laminates that were obtained by extruding the thermoplastic resin layer. As a result, in Example 6 in which the hardness of the rubber back roll was 60°, the difference between high and low of the embossment was 52.3 µm, and a cosmetic sheet having good designability was obtained. Moreover, in Example 7 in which the hardness of the rubber back roll was 94°, the difference between high and low of the embossment was 28.5 µm, and a cosmetic sheet having possible designability was obtained.

In Comparative Example 8, a rubber back roll having a hardness of 40° was used. Moreover, high-density polyethylene was used for the thermoplastic resin layer, and an embossing process was performed on the pre-embossed laminate that was obtained by extruding the thermoplastic resin layer. As a result, even though the difference between high and low of the embossment was 81.6 µm, the rubber back roll was too soft and embossment was lost, so suitability of the embossing process was poor.

In Comparative Example 9 to Comparative Example 11, a rubber back roll having a hardness of 95° was used. Moreover, high-density polyethylene was used for the thermoplastic resin layer, and an embossing process was performed on the pre-embossed laminates that were obtained by extruding the thermoplastic resin layer. As a result, the rubber back roll was too hard, and reproducibility of the embossment was poor, and designability was also poor.

From these results it was clear that Example 1 to Example 7 were superior. Therefore, it could be verified that with the present invention it is possible to provide a manufacturing method for inexpensively manufacturing cosmetic sheet having a good uneven shape using base paper that is 50% or more cellulose fiber without using a male-female embossing unit, and to provide cosmetic sheets and cosmetic panels that are manufactured by the manufacturing method.

Continuing, improvement of designability by performing inkjet printing was confirmed from Examples 8 to 11 below.

Example 8

(1) Patterned base paper was made by providing a pattern layer by printing a pattern on the surface of mixed paper (TP23, manufactured by Tentok Paper Co., Ltd.) that has a weight of 23 g/m² (33 µm thickness) using a nitrified cotton ink (PCNT ink, manufactured by Toyo Ink Co., Ltd.) and urethane ink (PCRNT ink, manufactured by Toyo Ink Co., Ltd.).

(2) A pre-embossed laminate having base paper layers on the front and back of a thermoplastic resin layer was made using the same materials and procedure as in (2) of Example 1.

(3) An embossing process was performed on the pre-embossed laminate using the same procedure as in (3) of Example 1. The unevenness of the obtained cosmetic sheet had a maximum difference between high and low of 72.5 µm, and good designability was confirmed.

(4) Inkjet printing was performed on the side where printing was performed on the obtained cosmetic sheet using UV inkjet ink (FV03, manufactured by Toyo Ink Co., Ltd.) so that the printing resolution was 720 dpi×720 dpi (dots per inch), and the ink limit became 300%. After that, a cosmetic sheet was made by forming a transparent surface protective coating to which an isocyanate hardening agent was added to a main agent having acrylic polyol as the main component on the cosmetic sheet on which inkjet printing was performed at a dry weight of 7 g/m². As a result, good designability was confirmed.

(5) 1-liquid ethylene vinyl acetate emulsion adhesive was applied at a liquid weight of 55 g/m² to a 2.5 mm thick MDF (medium density fiber) base material, and the obtained cosmetic sheet was adhered to this MDF base material using a laminating roll that was heated to a surface temperature of 100° C. As a result, a cosmetic panel having an uneven shape was made. The maximum unevenness of the obtained cosmetic panel was 58.7 µm, and a cosmetic panel having good unevenness and designability could be made.

Example 9

(1) High-density polyethylene was heated and melted at 300° C., extruded into a film shape and pressed between mixed paper (TP23, manufactured by Tentok Paper Co., Ltd.) that has a weight of 23 g/m² (33 µm thickness) and mixed paper (FIXW23, manufactured by Oji Paper Co., Ltd.) that has a weight of 23 g/m² (30 µm thickness). By cooling immediately after that, a pre-embossed laminate having base papers on the front and back of a polyethylene layer (thermoplastic resin layer) was obtained. The thickness of the polyethylene layer was 50 µm, and the overall thickness of the pre-embossed laminate was 116 µm.

(2) An embossing process was performed on the pre-embossed laminate using the same procedure as in (3) of Example 1. As a result, the maximum unevenness of the cosmetic sheet was 71.2 µm, and good designability was confirmed.

(3) Inkjet printing was performed on the base paper of the obtained cosmetic sheet using UV inkjet ink (FV03, manufactured by Toyo Ink Co., Ltd.) so that the printing resolution was 720 dpi×720 dpi (dots per inch), and the ink limit became 300% (ink discharge amount WET, 10 ml/m²). After that, a cosmetic sheet was made by forming a transparent surface protective coating to which an isocyanate hardening agent was added to a main agent having acrylic polyol as the main component on a cosmetic sheet on which inkjet printing was performed at a dry weight of 7 g/m². As a result, good designability was confirmed.

(4) 1-liquid ethylene vinyl acetate emulsion adhesive was applied at a liquid weight of 55 g/m² to a 2.5 mm thick MDF (medium density fiber) base material, and the obtained cosmetic sheet was adhered to this MDF base material using a laminating roll that was heated to a surface temperature of 100° C. As a result, a cosmetic panel having an uneven shape was made. The maximum unevenness of the obtained cosmetic panel was 59.5 µm, and a cosmetic panel having good unevenness and designability could be made.

Example 10

(1) Patterned base paper was made by printing a pattern on the surface of mixed paper (TP23, manufactured by Tentok Paper Co., Ltd.) that has a weight of 23 g/m² (33 μm thickness) using UV inkjet ink (FV03, manufactured by Toyo Ink Co., Ltd.).

(2) High-density polyethylene was heated and melted at 300° C., extruded into a film shape and pressed between the side of the patterned base paper where printing was not performed and mixed paper (FIXW23, manufactured by Oji Paper Co., Ltd.) that has a weight of 23 g/m² (30 μm thickness). By cooling immediately after that, a pre-embossed laminate having base papers on the front and back of a polyethylene layer (thermoplastic resin layer) was obtained. The thickness of the polyethylene layer was 50 μm, and the overall thickness of the pre-embossed laminate was 116 μm.

(3) The surface with the printed pattern of the obtained pre-embossed laminate was heated to a surface temperature of 130° C. near the melting point of polyethylene. An uneven shape was applied to the pre-embossed laminate by sandwiching the pre-embossed laminate between an embossing roll made using a corrosion method and having a maximum depth of 150 μm and a rubber back roll having a HS (Hardness Spring) hardness of 50° measured by a hardness tester according to JIS K 6301 type A, after which the laminate was immediately cooled. As a result, a cosmetic sheet having an uneven shape was made. The unevenness of the obtained cosmetic sheet had a maximum difference between high and low of 68.1 μm, and good designability was confirmed.

(4) 1-liquid ethylene vinyl acetate emulsion adhesive was applied at a liquid weight of 55 g/m² to a 2.5 mm thick MDF (medium density fiber) base material, and the obtained cosmetic sheet was adhered to this MDF base material using a laminating roll that was heated to a surface temperature of 100° C. As a result, a cosmetic panel having an uneven shape was made. The maximum unevenness of the obtained cosmetic panel was 56.5 μm, and a cosmetic panel having good unevenness and designability could be made.

Example 11

(1) A pattern was printed on the surface of mixed paper (TP23, manufactured by Tentok Paper Co., Ltd.) that has a weight of 23 g/m² (33 μm thickness) using UV inkjet ink (FV03, manufactured by Toyo Ink Co., Ltd.). After that, a patterned base paper was made by forming a transparent surface protective coating to which an isocyanate hardening agent was added to a main agent having acrylic polyol as the main component on the mixed paper on which a pattern was printed at a dry weight of 7 g/m².

(2) High-density polyethylene was heated and melted at 300° C., extruded into a film shape and pressed between the side of the patterned base paper where printing was not performed and mixed paper (FIXW23, manufactured by Oji Paper Co., Ltd.) that has a weight of 23 g/m² (30 μm thickness). By cooling immediately after that, a pre-embossed laminate having base papers on the front and back of a polyethylene layer (thermoplastic resin layer) was obtained. The thickness of the polyethylene layer was 50 μm, and the overall thickness of the pre-embossed laminate was 116 μm.

(3) The surface with the printed pattern of the obtained pre-embossed laminate was heated to a surface temperature of 130° C. near the melting point of polyethylene. An uneven shape was applied to the pre-embossed laminate by sandwiching the pre-embossed laminate between an embossing roll made using a corrosion method and having a maximum depth of 150 μm and a rubber back roll having an HS (Hardness Spring) hardness of 50° measured by a hardness tester according to JIS K 6301 type A, after which the laminate was immediately cooled. As a result, a cosmetic sheet having an uneven shape was made. The unevenness of the obtained cosmetic sheet had a maximum difference between high and low of 69.8 μm, and good designability was confirmed.

(4) 1-liquid ethylene vinyl acetate emulsion adhesive was applied at a liquid weight of 55 g/m² to a 2.5 mm thick MDF (medium density fiber) base material, and the obtained cosmetic sheet was adhered to this MDF base material using a laminating roll that was heated to a surface temperature of 100° C. As a result, a cosmetic panel having an uneven shape was made. The maximum unevenness of the obtained cosmetic panel was 57.2 μm, and a cosmetic panel having good unevenness and designability could be made.

The configuration and evaluation results of Example 8 to Example 11 are summarized in Table 2.

TABLE 2

| | Base Paper (1) Thickness (μm) | Thermoplastic Resin Type | Thermoplastic Resin Thickness | Base Paper (2) Thickness (μm) | Printed Pattern Layer Before InkJet Printing (Y/N) | Timing of Performing InkJet Printing | Surface Protective Film (Y/N) | Rubber Roll Hardness |
|---|---|---|---|---|---|---|---|---|
| Example 8 | 33 | HDPE | 50 | 30 | Yes | After embossment | Yes | 50° |
| Example 9 | 33 | HDPE | 50 | 30 | No | After embossment | Yes | 50° |
| Example 10 | 33 | HDPE | 50 | 30 | No | Before embossment | No | 50° |

TABLE 2-continued

| | | | | | | | | | |
|---|---|---|---|---|---|---|---|---|---|
| Example 11 | 33 | HDPE | 50 | 30 | No | Before embossment | Yes | 50° | |

| | High-Low Difference of Embossment (μm) | Designability Before InkJet Printing | Embossing Process Suitability | Laminate Suitability | Design-ability After InkJet Printing and After Embossment | Overall Evaluation |
|---|---|---|---|---|---|---|
| Example 8 | 72.5 | Good | Good | Good | Excellent | ○ |
| Example 9 | 71.2 | Good | Good | Good | Excellent | ○ |
| Example 10 | 68.1 | * | Good | Good | Excellent | ○ |
| Example 11 | 69.8 | * | Good | Good | Excellent | ○ |

Abbreviations in Table 2 related to the type of thermoplastic resin are the same as the abbreviations in Table 1. Moreover, the "*" notation in Table 2 indicates a state in which the embossing process was not performed, so was not evaluated.

From the above, it was confirmed that it is possible to manufacture a cosmetic sheet having high designability by performing inkjet printing on the surface of a sheet for which embossing has been performed on a pre-embossed laminate.

DESCRIPTION OF REFERENCE NUMBERS

1 Base paper
2 Base paper
3 Thermoplastic resin layer
4 Printed pattern layer
10 Cosmetic sheet
10a Laminate

What is claimed is:

1. A method for manufacturing a cosmetic sheet, the method comprising:
preparing a first base paper and a second base paper, each of which comprises cellulose fiber at 50% by mass or more, and has a thickness of 15 μm or more but less than 60 μm;
forming a laminate by arranging a thermoplastic resin layer having a melting point of no less than 100° C. and no greater than 200° C. and having a thickness of no less than 20 μm and no greater than 70 μm between the first base paper and the second base paper, and adhering the first base paper to the second base paper using the thermoplastic resin layer; and
introducing an uneven embossed shape into each of the first base paper, the second base paper and the thermoplastic resin layer of the laminate so that a front surface and a back surface of the laminate is each uneven in shape by passing the laminate between an embossing roll having a maximum depth of 15 μm or greater and a rubber back roll having a hardness of 50° or greater but less than 95° that is measured based on ISO 7619.

2. The method of claim 1, further comprising providing a printed pattern layer on a surface of one of the first base paper or the second base paper.

3. The method of claim 1, wherein inkjet printing is performed on a surface of the laminate before or after said introducing.

4. The method of claim 1, wherein the hardness of the rubber back roll that is measured based on ISO 7619 is no less than 50° and no greater than 65°.

5. A method for manufacturing a cosmetic sheet, the method comprises
printing a pattern on a first surface of a first base paper, the first base paper comprises cellulose fiber at 50% by mass or greater and has a thickness of 15 μm or more but less than 60 μm;
forming a laminate by laminating a second base paper to a second surface of the first base paper by way of a thermoplastic resin layer having a melting point of no less than 100° C. and no greater than 200° C. and having a thickness of no less than 20 μm and no greater than 70 μm, the second surface of the first base paper is opposite to the first surface of the first base paper;
introducing an uneven embossed shape into each layer of the laminate so that a front surface and a back surface of the laminate is each uneven in shape by passing the laminate between an embossing roll having a maximum depth of 15 μm or greater and a rubber back roll having a hardness of 50° or greater but less than 95° (ISO 7619).

6. A method for manufacturing a cosmetic panel, the method comprising:
preparing a cosmetic sheet that is manufactured using the method of claim 1; and
adhering the cosmetic sheet to at least one surface of a base material.

7. The method of claim 1, wherein said introducing is applied to the laminate, consisting of the first base paper, the second base paper and the thermoplastic resin layer, which is between the first base paper and the second base paper.

8. The method of claim 1, wherein the rubber back roll has a flat surface.

9. The method of claim 3, wherein the rubber back roll has a flat surface.

10. The method of claim 2, wherein said introducing is applied to the laminate, consisting of the printed pattern layer, the first base paper, the second base paper and the thermoplastic resin layer, which is between the first base paper and the second base paper.

11. The method of claim 5, wherein said introducing is applied to the laminate, consisting of the printed pattern, the first base paper, the second base paper and the thermoplastic resin layer, which is between the first base paper and the second base paper.

12. The method of claim 5, wherein the rubber back roll has a flat surface.

* * * * *